(12) United States Patent
Forest

(10) Patent No.: US 11,680,727 B2
(45) Date of Patent: Jun. 20, 2023

(54) HEAT EXCHANGER WITH VERTICAL PIPES

(71) Applicant: Philippe Forest, Montreal (CA)

(72) Inventor: Philippe Forest, Montreal (CA)

(73) Assignee: Philippe Forest, Montreal (CA)

( * ) Notice: Subject to any disclaimer, the term of this patent is extended or adjusted under 35 U.S.C. 154(b) by 289 days.

(21) Appl. No.: 16/608,120

(22) PCT Filed: Apr. 25, 2018

(86) PCT No.: PCT/IB2018/052872
§ 371 (c)(1),
(2) Date: Oct. 24, 2019

(87) PCT Pub. No.: WO2018/198044
PCT Pub. Date: Nov. 1, 2018

(65) Prior Publication Data
US 2020/0132335 A1    Apr. 30, 2020

Related U.S. Application Data

(60) Provisional application No. 62/489,594, filed on Apr. 25, 2017.

(51) Int. Cl.
*F24F 12/00* (2006.01)
*B08B 9/032* (2006.01)
(Continued)

(52) U.S. Cl.
CPC .......... *F24F 12/006* (2013.01); *B08B 9/0321* (2013.01); *F24F 11/0001* (2013.01);
(Continued)

(58) Field of Classification Search
CPC ... F24F 12/006; F24F 11/0001; F28D 7/1607; F28F 1/08; F28F 1/30; B08B 9/0321
(Continued)

(56) References Cited

U.S. PATENT DOCUMENTS

| 4,337,824 A | 7/1982 | Kirk |
| 4,778,005 A * | 10/1988 | Smith ................ F28D 7/06 |
| | | 165/DIG. 411 |

(Continued)

FOREIGN PATENT DOCUMENTS

| CN | 105627793 A * | 6/2016 |
| CN | 105627793 A | 6/2016 |

(Continued)

*Primary Examiner* — Claire E Rojohn, III
(74) *Attorney, Agent, or Firm* — Brouillette Legal Inc.; Robert Brouillette

(57) ABSTRACT

There is provided a heat exchanger system comprising a housing defining a heat exchange compartment in which are extending a plurality of circular flexible pipes including radially extending fins, the fins defining a helical pattern along the length of each of the circular flexible pipes. There is also provided a circular flexible pipe having radially extending fins, the fins defining a helical pattern along the length of the circular flexible pipe. There is further provided a method and an apparatus for manufacturing a circular flexible pipe having radially extending fins, the fins defining a helical pattern along the length of the circular flexible pipe.

27 Claims, 13 Drawing Sheets

(51) Int. Cl.
*F24F 11/00* (2018.01)
*F28D 7/16* (2006.01)
*F28F 1/08* (2006.01)
*F28F 1/30* (2006.01)

(52) U.S. Cl.
CPC .............. *F28D 7/1607* (2013.01); *F28F 1/08* (2013.01); *F28F 1/30* (2013.01)

(58) Field of Classification Search
USPC ........................................................... 165/57
See application file for complete search history.

(56) References Cited

U.S. PATENT DOCUMENTS

| | | | | |
|---|---|---|---|---|
| 5,544,700 | A * | 8/1996 | Shagoury | F02C 7/14 165/161 |
| 5,638,898 | A * | 6/1997 | Gu | F28F 1/08 165/DIG. 532 |
| 5,915,472 | A * | 6/1999 | Takikawa | F02M 26/32 165/158 |
| 6,543,675 | B1 * | 4/2003 | Laudic | B23K 1/0012 228/183 |
| 8,720,199 | B2 * | 5/2014 | Gaensler | F02M 26/32 165/157 |
| 9,097,466 | B2 * | 8/2015 | Braic | F02B 29/0462 |
| 9,212,836 | B2 * | 12/2015 | Welch | F28B 1/02 |
| 9,885,523 | B2 * | 2/2018 | Zimmer | F28F 9/0133 |
| 2001/0025700 | A1 * | 10/2001 | Cottingham | F28D 21/0012 165/54 |
| 2006/0289153 | A1 | 12/2006 | Mulder | |
| 2008/0250800 | A1 * | 10/2008 | Wetzel | F24F 1/022 62/179 |
| 2014/0060504 | A1 * | 3/2014 | Collins | F02M 26/32 123/568.12 |

FOREIGN PATENT DOCUMENTS

| | | |
|---|---|---|
| WO | 8705686 A1 | 9/1987 |
| WO | 2008121724 A1 | 10/2008 |

* cited by examiner

HEAT EXCHANGER WITH VERTICAL PIPES

CROSS-REFERENCE TO RELATED APPLICATIONS

The present application is the U.S. National Stage of International PCT Application No. PCT/IB2018/052872, filed Apr. 25, 2018, entitled "HEAT EXCHANGER WITH VERTICAL PIPES ". Through that International Application the present application claims priority to U.S. Provisional Patent Application Ser. No. 62/489,594, filed Apr. 25, 2017, entitled "A HEAT EXCHANGER SYSTEM". The contents of both of the aforementioned applications are incorporated herein by reference in their entirety.

TECHNICAL FIELD

The present invention relates to the field of heat exchangers and more particularly to a heat exchanger system comprising a plurality of pipes having radial fins.

BACKGROUND

Heat exchangers are systems adapted to transfer heat between two fluids like air, water or other types of liquid coolants. Among the known uses, heat exchangers are widely utilized to diminish the use of typical fossil fuels or other sources of energy for heating air or liquids, by recycling the heat emanating from those heat sources. Such applications of heat exchangers therefore tend to allow a reduced impact of greenhouse gases on the environment and permit buildings and industrial or commercial plants to better manage their heat consumption by optimizing their heat waste recuperation. Heat exchangers are also widely used in industries and buildings where it is necessary to control the temperature such as the temperature of air or the temperature of liquid exiting the heat exchanger.

Different types of heat exchangers exist such as air to air, liquid to air or liquid to liquid, where the two fluids are either in direct contact with each other or separated by a solid wall. They can either be in a counter-current flow, a parallel current flow or a cross-current flow configuration depending on their use. Many different designs of heat exchangers exist such as shell and tube heat exchangers, plate heat exchangers or direct contact heat exchangers, all of which can be installed in a variety of industries and buildings like power stations, petrochemical plants or natural gas processing industries.

Shell and tube heat exchangers are particularly adapted for high pressure applications which can be found in a variety of industrial plants. A shell and tube heat exchanger typically comprises an exterior casing, a front header, a rear header, a plurality of baffles and a plurality of pipes disposed therein, the pipes usually being plain or longitudinally finned. A typical shell and tube heat exchanger further comprises a shell inlet, a shell outlet, a header inlet and a header outlet. A first fluid is conveyed in the plurality of pipes through the header inlet toward the header outlet while a second fluid flows around the plurality of pipes, through the shell inlet toward the shell outlet. Therefore as fluids are conveyed through the pipes and the shell, a heat transfer occurs between the two fluids where, for instance, the heat of the hot fluid conveyed in the pipes, is transferred, through the pipes walls, to the fluid flowing in the shell.

While shell and tube heat exchangers usually comprise rigid pipes having a plain or longitudinally finned surface, as well as a plurality of baffles adapted to redirect the fluid flow in the shell, the heat exchange rate tends to be lower than expected. This is typically due to the fact that pressure drops proportionally to the number of baffles present in the heat exchanger, which ultimately negatively affects the efficiency of the heat exchanger. Furthermore, these types of heat exchangers tend to be expensive to manufacture and therefore tend to be less appealing for potential customers.

There is therefore a need for an improved low cost heat exchanger system adapted to reduce the pressure drop created by a plurality of baffles and for maximizing the efficiency of the heat transfer.

SUMMARY

According to a broad aspect, there is provided a heat exchanger system comprising:
  a housing comprising a lower wall, an upper wall and at least one side wall extending therebetween, the housing defining a chamber including a lower compartment, an upper compartment and a heat exchange compartment extending therebetween, the upper compartment including an intake section and an outtake section;
  an upper perforated plate dividing the chamber into the upper compartment and the heat exchange compartment, the upper perforated plate comprising at least one intake hole located in the intake section and one outtake hole located in the outtake section;
  a lower perforated plate dividing the chamber into the lower compartment and the heat exchange compartment, the lower perforated plate comprising at least two holes;
  at least one intake pipe associated with the at least one intake hole of the upper perforated plate and with one of the at least two holes of the lower perforated plate, the at least one intake pipe being configured for conveying a first fluid at a first temperature from the intake section of the upper compartment to the lower compartment;
  at least one outtake pipe associated with the at least one outtake hole of the upper perforated plate and the other of the at least two holes of the lower perforated plate, the at least one outtake pipe being configured for conveying the first fluid from lower compartment to the outtake section of the upper compartment;
  an inlet defined in the at least one side wall and allowing the first fluid to enter the intake section of the upper compartment;
  an outlet defined in the at least one side wall and allowing the first fluid to exit the outtake portion of the upper compartment; and
  a pair of openings defined in the at least one side wall for allowing a flow of a second fluid at a second temperature to travel in the heat exchange compartment, around each of the at least one intake pipe and at least one outtake pipe.

In one feature, the housing comprises a box-shaped housing. Preferably, the box-shaped housing comprises the lower wall, the upper wall and four side walls extending therebetween.

In another feature, the intake section and the outtake section of the upper compartment are defined by a divider. Preferably, the divider extends from the upper perforated plate to the upper wall of the housing.

In a further feature, the upper perforated plate comprises fifty intake holes and fifty outtake holes, and the lower perforated plate comprises one hundred holes. In this feature, the at least one intake pipe comprises fifty intake pipes, each of the fifty intake pipes being associated with a corresponding one of the fifty intake holes of the upper perforated plate, and to one of the holes of the lower perforated plate. Still in this feature, the at least one outtake pipe comprises fifty outtake pipes, each of the fifty outtake pipes being associated with a corresponding one of the fifty outtake holes of the upper perforated plate and to one of the holes of the lower perforated plate.

In yet another feature, the lower compartment comprises a pair of deflector walls for redirecting the first fluid from the at least one intake pipe toward the at least one outtake pipe.

In another feature, the lower compartment comprises an orifice for expelling a condensation liquid generated during the operation of the heat exchanger system.

In still another feature, the heat exchanger system further comprises a cleaning system. Preferably, the cleaning system comprises at least one sprinkler mounted in the upper compartment and configured for sprinkling a liquid into at least one of the at least one intake pipe and of the at least one outtake pipe. More preferably, the at least one sprinkler is mounted to the upper wall of the housing.

In yet another feature, the at least one intake pipe or the at least one outtake pipe is a circular flexible pipe. Preferably, the circular flexible pipe is a corrugated flexible pipe.

In a further feature, the at least one intake pipe or the at least one outtake pipe is a circular rigid pipe.

In still a further feature, the pipe comprises a plurality of fins extending radially. Preferably, the fins are distributed along a length of the pipe in a helical pattern.

In another feature, the pipe comprises an interior pipe layer and an exterior pipe layer. Preferably, the exterior pipe layer comprises the radially extending fins. More preferably, the exterior pipe layer is wound about the interior pipe layer.

In an additional feature, the interior pipe layer and the exterior pipe layer are corrugated. Preferably, corrugations of the corrugated exterior pipe layer match corrugations of the corrugated interior pipe layer. More preferably, corrugations of the corrugated exterior pipe layer are in registry with corrugations of the corrugated internal pipe layer.

In another feature, the pipe is made from a material selected from the group consisting of stainless steel, galvanized steel or aluminum.

In a further feature, the first fluid is stale air and the second fluid is clean air. Preferably, the stale air travels sequentially in the intake section, the at least one intake pipe, the lower compartment, the at least one outtake pipe and the outtake section while the clean air travels around each of the at least one intake pipe and at least one outtake pipe in the heat exchange compartment.

In one feature, the heat exchanger system comprises a current flow heat exchanger system.

In another feature, the heat exchanger system comprises counter-current flow heat exchanger system.

In another broad aspect, there is provided a circular pipe comprising a plurality of fins extending radially, the plurality of fins being distributed along a length of the pipe in a helical pattern.

In one feature, the pipe is a flexible pipe. Preferably, the pipe is a corrugated pipe.

In another feature, the pipe is a rigid pipe.

In still another feature, the pipe comprises an interior pipe layer and an exterior pipe layer. Preferably, the exterior pipe layer comprises the radially extending fins. More preferably, the exterior pipe layer is wound about the interior pipe layer.

In yet another feature, the interior pipe layer and the exterior pipe layer are corrugated. Preferably, corrugations of the corrugated exterior pipe layer match corrugations of the corrugated interior pipe layer. More preferably, corrugations of the corrugated exterior pipe layer are in registry with corrugations of the corrugated internal pipe layer.

In still another feature, the pipe is made from a material selected from the group consisting of stainless steel, galvanized steel or aluminum.

According to another broad aspect, there is provided the use of a circular pipe comprising a plurality of fins extending radially, the plurality of fins being distributed along a length of the pipe in a helical pattern, in a heat exchanger system.

According to yet another broad aspect, there is provided a method for manufacturing a circular flexible pipe including a plurality of radially extending fins distributed along a length of the circular flexible pipe in a helical pattern. In this borad aspect, the method comprises:

providing a first sheet of a first material;

corrugating the first of the first material to obtain a first sheet of corrugated first material, the first sheet of corrugated first material having a first set of longitudinal corrugations;

winding the corrugated first sheet of first material on a rolling shaft in a helical pattern to obtain a corrugated interior pipe layer;

providing a second sheet of a second material;

corrugating the second sheet of the second material to obtain a second sheet of corrugated second material, the second sheet of corrugated second material having a second set of longitudinal corrugations and a plan;

partially cutting the second sheet of corrugated second material at an angle relative to the second set of longitudinal corrugations to define the plurality of fins;

lifting the fins of the second sheet of the corrugated second material such that the fins become generally perpendicular to the plan of the second sheet of the corrugated second material;

winding the second sheet of the corrugated second material onto the corrugated interior pipe layer in a helical pattern to obtain a corrugated exterior pipe layer; and removing the flexible circular pipe from the rolling shaft once the length has been reached.

In one feature, the second set of longitudinal corrugations matches the first set of longitudinal corrugations. Preferably, the second set of longitudinal corrugations is in registry with the first set of corrugations when the second sheet of the corrugated second material is wound onto the corrugated interior pipe layer.

In another feature, the corrugated flexible pipe is made from a material selected from the group consisting of stainless steel, galvanized steel or aluminum.

According to still another feature, there is provided an apparatus for manufacturing circular flexible pipe including a plurality of radially extending fins distributed along a length of the circular flexible pipe in a helical pattern. In this broad aspect, the apparatus comprises:

a first corrugation unit configured for corrugating a first sheet of a first material to obtain a first sheet of corrugated first material, the first sheet corrugated first material having a first set of longitudinal corrugations;

a second corrugation unit for corrugating a second sheet of a second material to obtain a second sheet of corrugated second material, the second sheet of corrugated second material having a second set of longitudinal corrugations and a plan;

a cutting unit for partially cutting the second sheet of corrugated second material at an angle relative to the second set of longitudinal corrugations to define the plurality of fins;

a rolling shaft configured for winding the corrugated first sheet of material in a helical pattern to obtain a corrugated interior pipe layer and for winding the second sheet of corrugated second material onto the corrugated interior pipe layer in a helical pattern to obtain a corrugated exterior pipe layer.

In one feature, the apparatus further comprises a lifting unit positioned between the cutting unit and the rolling shaft. In this aspect, the lifting unit is configured for lifting the fins of the second sheet of the corrugated second material such that the fins become generally perpendicular to the plan of the second sheet of the corrugated second material.

In an additional feature, the cutting unit comprises at least one cutting roller rotating about a rotation axis perpendicular to the second set of longitudinal corrugations. The the at least one cutting roller comprises at least one cutting projection, the at least one cutting projection extending radially and parallel to the rotation axis of the cutting roller.

In another feature, the second set of longitudinal corrugations matches the first set of longitudinal corrugations. Preferably, the first and second corrugations units are positioned relative to the rolling shaft such that the second set of longitudinal corrugations is in registry with the first set of corrugations when the second sheet of the corrugated second material is wound onto the corrugated interior pipe layer.

According to another broad aspect, there is provided a method for manufacturing a circular rigid pipe including a plurality of radially extending fins distributed along a length of the circular rigid pipe in a helical pattern. In this broad aspect, the method comprises:

providing a first sheet of a first material;
winding the first sheet of first material on a rolling shaft in a helical pattern to obtain an interior pipe layer;
providing a second sheet of a second material;
partially cutting the second sheet of second material at an angle relative to a length of the second sheet of the second material to define the plurality of fins;
lifting the fins of the second sheet of the second material such that the fins become generally perpendicular to a plan of the second sheet of the second material;
winding the second sheet of the second material onto the interior pipe layer in a helical pattern to obtain an exterior pipe layer; and
removing the rigid circular pipe from the rolling shaft once the length has been reached.

According to still another broad feature, there is provided an apparatus for manufacturing circular rigid pipe including a plurality of radially extending fins distributed along a length of the circular rigid pipe in a helical pattern. In this broad aspect, the apparatus comprises:

a cutting unit for partially cutting a second sheet of a second material at an angle relative to a length of the second sheet of the second material to define the plurality of fins;
a rolling shaft configured for winding the a first sheet of a first material in a helical pattern to obtain an interior pipe layer and for winding the second sheet of the second material onto the interior pipe layer in a helical pattern to obtain an exterior pipe layer.

According to yet another broad aspect, there is provided a method for manufacturing a circular flexible pipe including a plurality of radially extending fins distributed along a length of the circular flexible pipe in a helical pattern. In this broad aspect, the method comprises:

providing a sheet of a material;
corrugating the sheet of material to obtain a sheet of corrugated material, the first sheet of corrugated first material having a set of longitudinal corrugations;
partially cutting the sheet of corrugated material at an angle relative to the set of longitudinal corrugations to define the plurality of fins;
lifting the fins of the sheet of the corrugated material such that the fins become generally perpendicular to a plan of the sheet of the corrugated material;
winding the sheet of the corrugated material onto a rolling shaft in a helical pattern to obtain the flexible circular pipe; and
removing the flexible circular pipe from the rolling shaft once the length has been reached.

According to another broad aspect, there is provided a method for manufacturing a circular rigid pipe including a plurality of radially extending fins distributed along a length of the circular rigid pipe in a helical pattern, the method comprising:

providing a sheet of a material;
partially cutting the sheet of material at an angle relative a length of the sheet of material to define the plurality of fins;
lifting the fins of the sheet of material such that the fins become generally perpendicular to a plan of the sheet of material;
winding the sheet of material onto a rolling shaft in a helical pattern to obtain the rigid circular pipe; and
removing the rigid circular pipe from the rolling shaft once the length has been reached.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION

Figure 1:
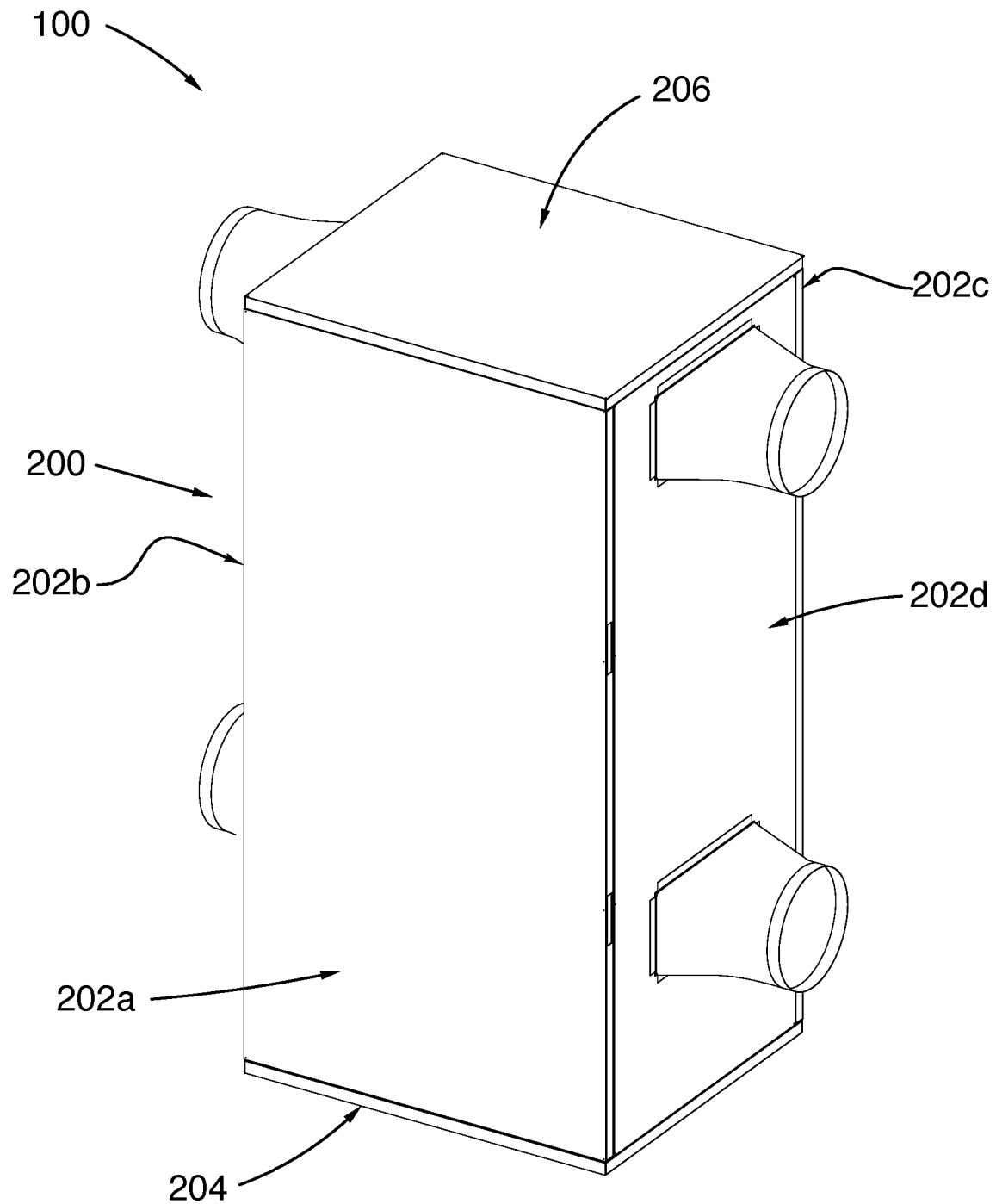
FIG. 1 is a perspective view of a heat exchanger system, in accordance with one embodiment.

Referring to FIGS. 1 to 5, there is shown a heat exchanger system 100 adapted to transfer heat between two fluids. In one embodiment, the fluids are low density gases such as air. Heat exchanger system 100 is adapted to be installed in environments having stale air such as in rubber factories, restaurant extractor hoods, welding hoods and the like. The heat exchanger system 100 comprises a casing 200 having four lateral walls 202a, 202b, 202c and 202d, a lower wall 204 and an upper wall 206 defining a chamber 207 including a lower compartment 208, an upper compartment 210 and an exchange compartment 212, extending between the lower compartment 208 and the upper compartment 210. The heat exchanger system 100 further comprises a controller (not shown) adapted to monitor the efficiency thereof.

In one embodiment, the lateral walls 202b and 202d of casing 200 have a height D1 of 90 inches (see FIG. 3) and a width D2 of 36.50 inches (see FIG. 4), while the lateral walls 202a and 202c have the same height D1 as lateral walls 202b and 202d but a width D6 of 45.5 inches. While the casing 200 of this embodiment has a generally rectangular box or cuboid shape, it will be appreciated that casing 200 could have a different shape without departing from the scope of the invention. For instance, casing 200 could have a generally cylindrical shape, with circular lower and upper walls and a single, cylindrical lateral wall.

As best shown in FIGS. 2 to 5, the upper compartment 210 of the casing 200 is equally divided in two separate sections, namely an intake section 214 and an outtake section 216, thanks to a vertical wall or divider 218 extending from an upper perforated plate 220 to the upper wall 206 of the casing 200. In the illustrated embodiment, divider 218 is configured for creating an airtight separation between the intake section 214 and the outtake section 216. In one embodiment, the divider 218 is positioned at 23.028 inches from the lateral wall 202b, but it will be appreciated that divider 218 could be positioned in other locations without departing from the scope of this embodiment.

Figure 6:
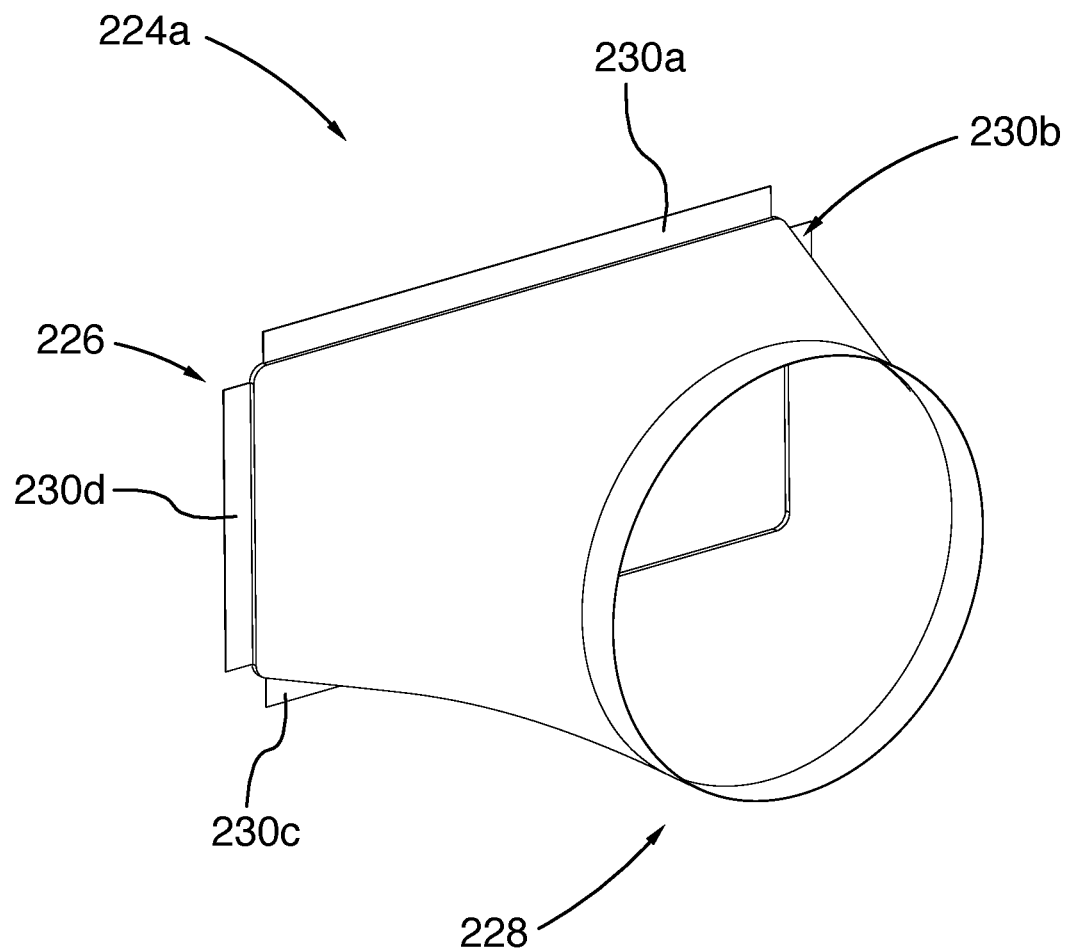
FIG. 6 is a perspective view of an adaptor configured to be positioned and secured on the heat exchanger of FIG. 1, in accordance with one embodiment.

The intake section 214 is provided with an inlet 221 comprising a generally rectangular opening 222 and an adaptor 224a configured to convey warm stale air from a ventilation pipe (not shown) into the intake section 214. In the illustrated embodiment, the rectangular opening 222 is located on an upper portion of the lateral wall 202b. In a like manner, the outtake section 216 is provided with an outlet 231 comprising a rectangular opening 232 and an adaptor 224b configured to expel the warm stale air from the outtake section 216 toward a ventilation pipe (not shown). The rectangular opening 232 is located on an upper portion of lateral wall 202d. In one embodiment, the rectangular openings 222 and 232 are sized similarly, while the ventilation pipes for conveying the warm stale air (not shown) have a circular cross-section. In this embodiment, and as best shown in FIG. 6, the adaptor 224a has a funnelled shape extending from a first end 226, having the matching shape of the rectangular opening 222, to a circular second end 228 connectable to the ventilation pipes (not shown) for transferring the warm stale air to the casing 200 of the heat exchanger system 100. The first end 226 of the adaptor 224a comprises a plurality of flanges 230a, 230b, 230c and 230d configured to rest against lateral wall 202b and secure the adaptor 224a thereto, thanks to securing means such as screws, bolts and the like, the adaptor 224a being positioned and installed in registry with the rectangular opening 222. Similarly, the outtake section 216 of the upper compartment 210 has an adaptor 224b, generally identical to adaptor 224a, which is positioned and installed in registry with rectangular opening 232 of the upper portion of lateral wall 202d of the casing 200.

Although in the illustrated embodiment, the openings 222 and 232 have a rectangular shape and the first end 226 of the adaptors 224a and 224b also have a matching rectangular shape, it should be understood, that other shapes are possible without departing from the scope of the embodiment. For instance, the openings 222 and 232 and the first end 226 of adaptors 224a and 224b could have a square shape, an elliptic shape, or any other shape.

Figure 3:
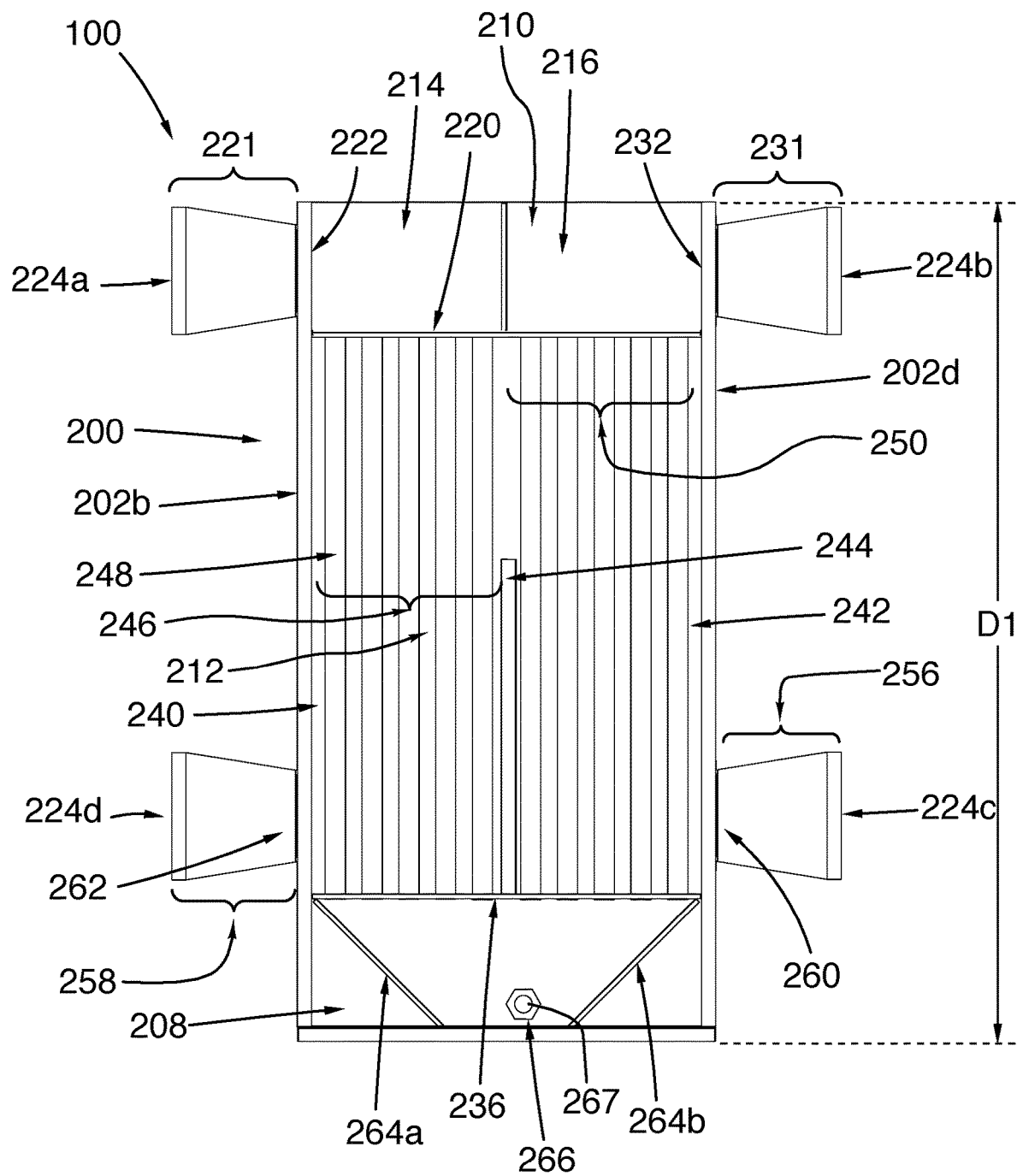
FIG. 3 is a front view of the heat exchanger system shown in FIG. 2.
Figure 4:
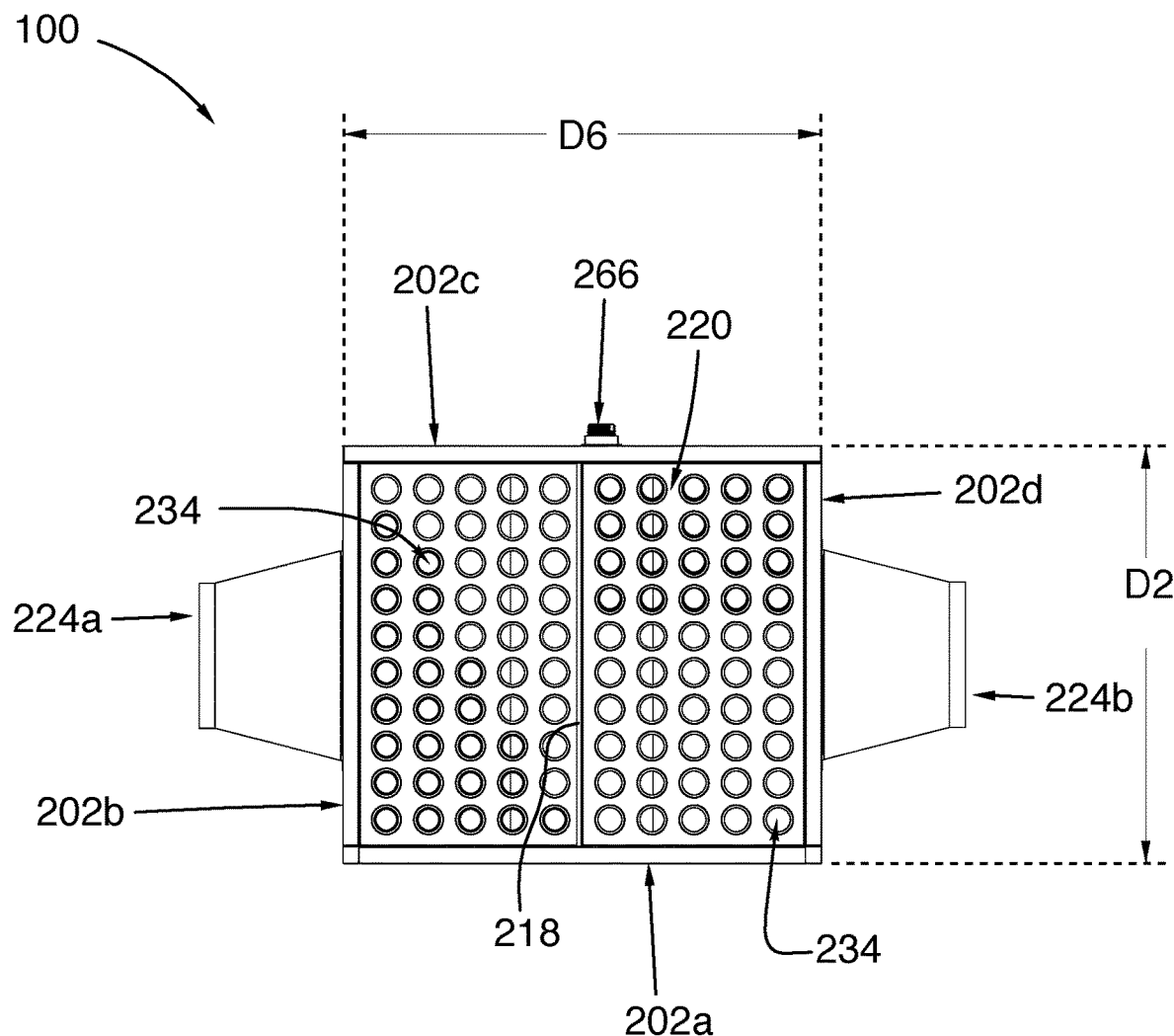
FIG. 4 is a top view of the heat exchanger system shown in FIG. 2, showing the upper compartment and a perforated upper plate.

As best shown in FIGS. 3 and 4, the opening 222 of intake section 214 and the opening 232 of outtake section 216 of the illustrated embodiment, are symmetrically disposed relative to the divider 218 of the upper compartment 210. Alternatively, the openings 222 and/or 232 of the intake and outtake sections 214 and 216 could either be positioned on different lateral walls, for instance lateral wall 202a for inlet opening 222 and on lateral wall 202c for outlet opening 232, or on identical lateral walls such as lateral walls 202a or 202c for inlet opening 222 and outlet opening 232.

Figure 7A:
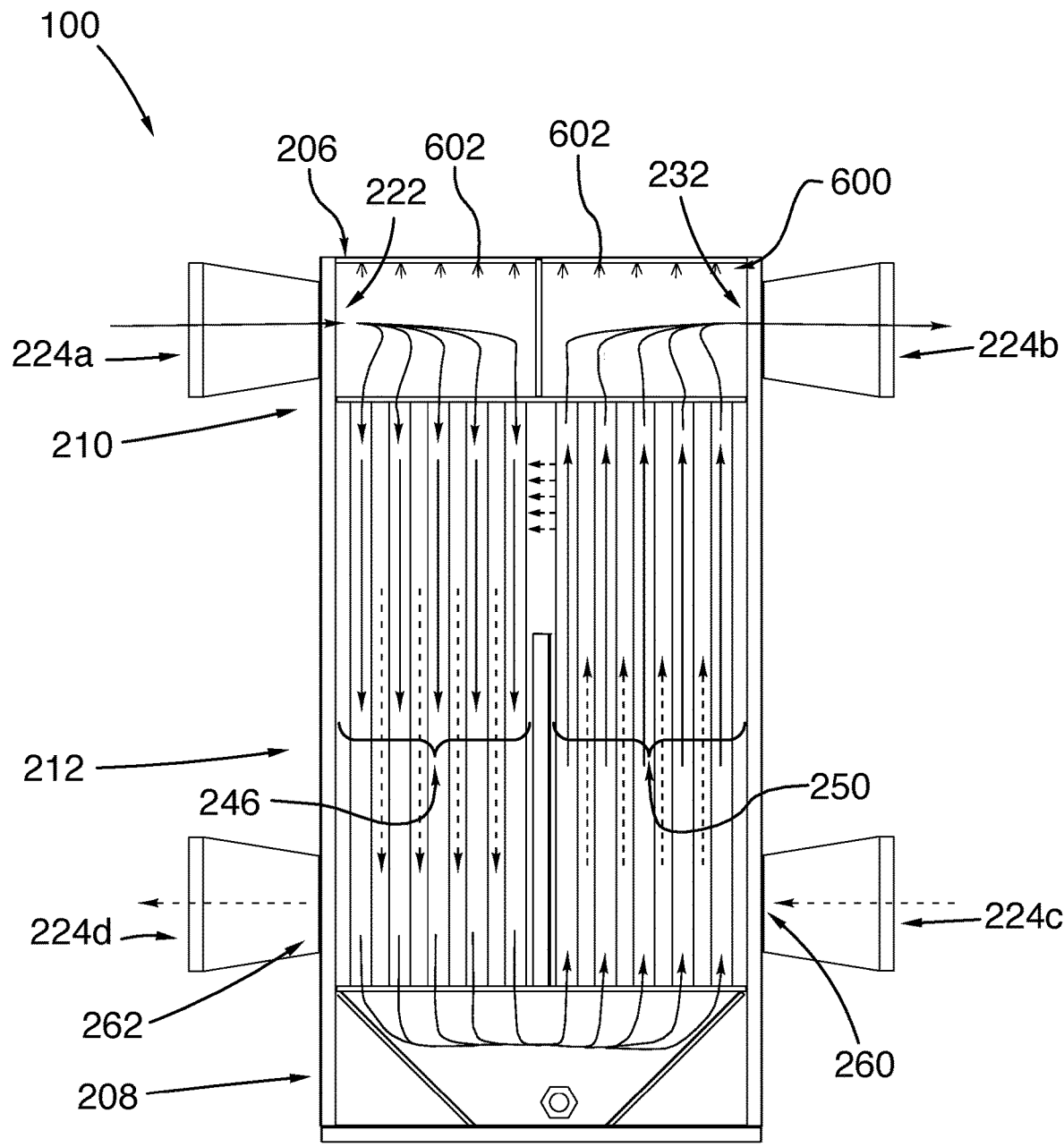
FIG. 7A is a front view of the heat exchanger shown in FIG. 2, illustrating the air flow in a parallel current flow configuration.
Figure 7B:
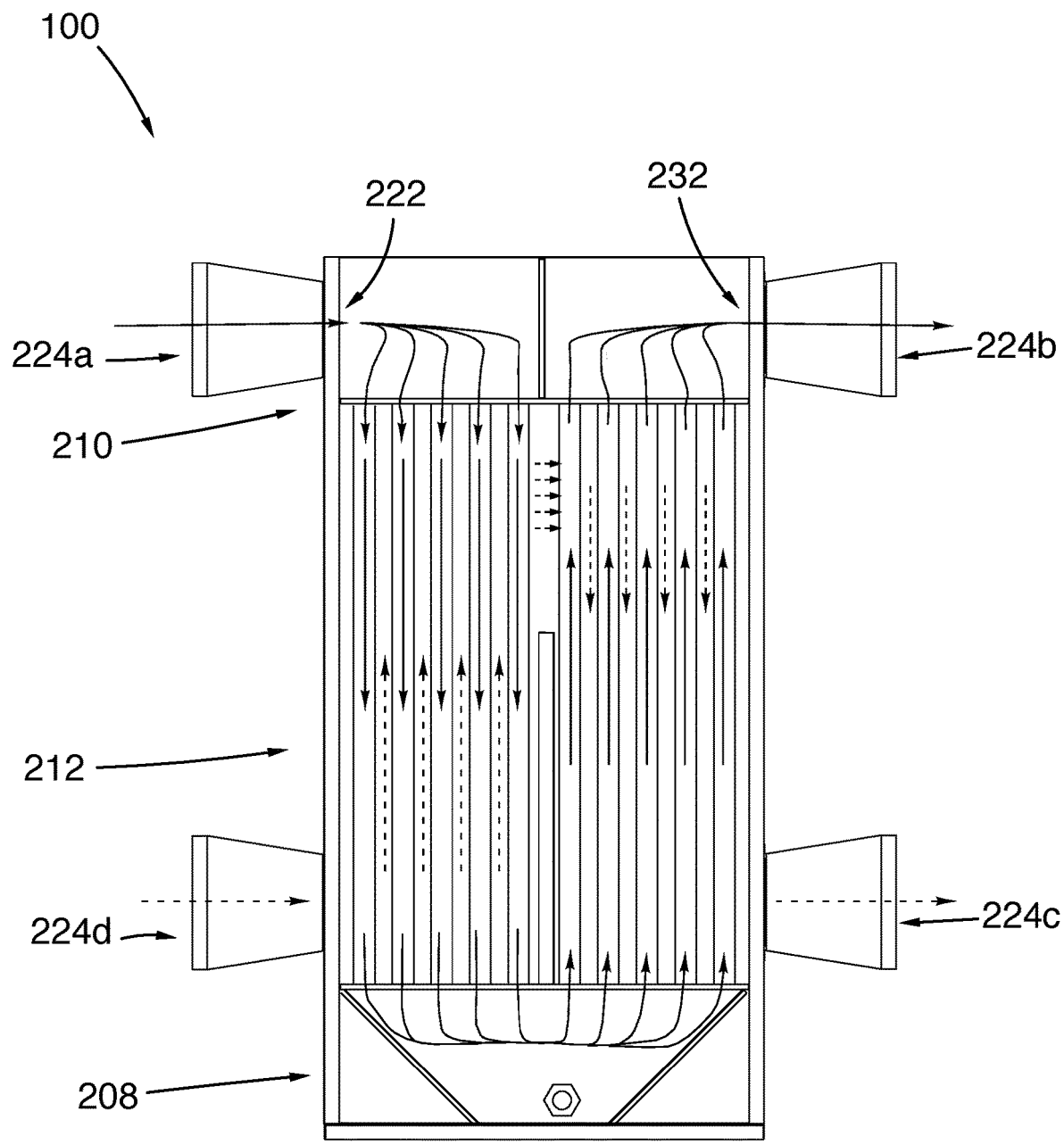
FIG. 7B is a front view of the heat exchanger shown in FIG. 2, illustrating the air flow in a counter-current flow configuration.

Turning now to FIGS. 4, 7A and 7B, the upper perforated plate 220 will now be described. Upper perforated plate 220 extends between lateral walls 202a, 202b 202c and 202d to divide the chamber 207 into the upper compartment 210 and the exchange compartment 212. Upper perforated plate 220 comprises a plurality of circular holes 234 for receiving a corresponding plurality of circular pipes 248 therein, as it will become apparent below. In one embodiment, the circular holes 234 of the upper perforated plate 220 are equally distributed thereon, where a one half of the circular holes 234 is located in intake section 214 and while the other half of the circular holes 234 is located in the outtake section 216. For instance, in one embodiment, the upper perforated plate 220 comprises one hundred circular holes 234, where fifty circular holes 234 are located in the intake section 214 and fifty circular holes 234 are located in the outtake section 216. In this embodiment, the circular holes 234 of the intake section 214 and the circular holes of the outtake section 216 have a similar diameter. In one embodiment the upper perforated plate 220 is positioned at 14.250 inches from the upper wall 206, but it will be appreciated that upper perforated plate 220 could be positioned elsewhere without departing from the scope of the embodiment.

For dividing the heat exchange compartment 212 and the lower compartment 208 of the chamber 207, a lower perforated plate 236 is provided. Lower perforated plate 236 extends between lateral walls 202a, 202b 202c and 202d, and comprises a number of circular holes 238 corresponding to the number of holes 234 of the upper perforated plate 220. Accordingly, in one embodiment, the lower perforated plate 236 comprises one hundred circular holes 238. In this embodiment, each of the holes 238 of the lower perforated plate 236 is vertically aligned with a corresponding hole 234 of the upper perforated plate 220. As such, fifty circular holes 238 of the lower perforated plate 236 are located in registry with in the intake section 214 of the upper compartment 210 while the fifty other circular holes 238 are located in registry with the outtake section 216 of the upper compartment 210. In this embodiment, the circular holes 238 of the lower perforated plate 236 have a diameter similar to the diameter of the circular holes 234 of the upper perforated plate 220.

While in the above embodiment the upper perforated plate 220 and the lower perforated plate 236 each comprises one hundred holes, it will be understood that they could comprise a different number of holes and be configured differently without departing from the scope of the invention. For instance, upper perforated plate 220 could comprise only one hole 234 in the intake section 214 and one hole in the outtake section 216, while lower perforated plate 236 would comprise two holes, one hole being vertically aligned with the intake section 214 and the other being vertically aligned with the outtake sections 214, 216. Alternatively, the holes 238 of the lower perforated plate 236 could have no vertical alignment with the corresponding the holes 234 of the upper perforated plate 220, i.e. holes 238 and corresponding holes 234 could be offset relative to one another. In a further alternative, the number of holes 234 of the intake section 214 could differ from the number of holes 234 of the outtake section 216, with the number and position of hole 238 of the lower perforated plate 236 being adjusted accordingly. In still a further alternative, the various holes 234 and 238 could have diameters that vary, or have a shape that is different than a circular shape.

Turning now to FIGS. 2, 3, 7A and 7B, the heat exchanger system 100 comprises a plurality of circular pipes 248 extending between the upper perforated plate 220 and the lower perforated plate 236. The number of circular pipes 248 corresponds to the number of circular holes 234 or 238, each pipe 248 being sealingly mounted in one of the holes 234 of the upper perforated plate 220 and a corresponding hole 238 of the lower perforated plate 236. Each pipe 248 is adapted to convey a fluid from the intake section 214 of the upper compartment 210 toward the lower compartment 208, and from the lower compartment 208 to the outtake section 216 of the upper compartment 210. As such, the circular pipes 248 are regrouped into a first set 246 of circular pipes 248 extending from the circular holes 234 of the intake section 214 of the upper perforated plate 220 to the circular holes 238 of the lower perforated plate 236, and a second set 250 of circular pipes 248 extending from the circular holes 234 of the outtake section 216 of the upper perforated plate 220 to the circular holes 238 of the lower perforated plate 236.

Figure 8:
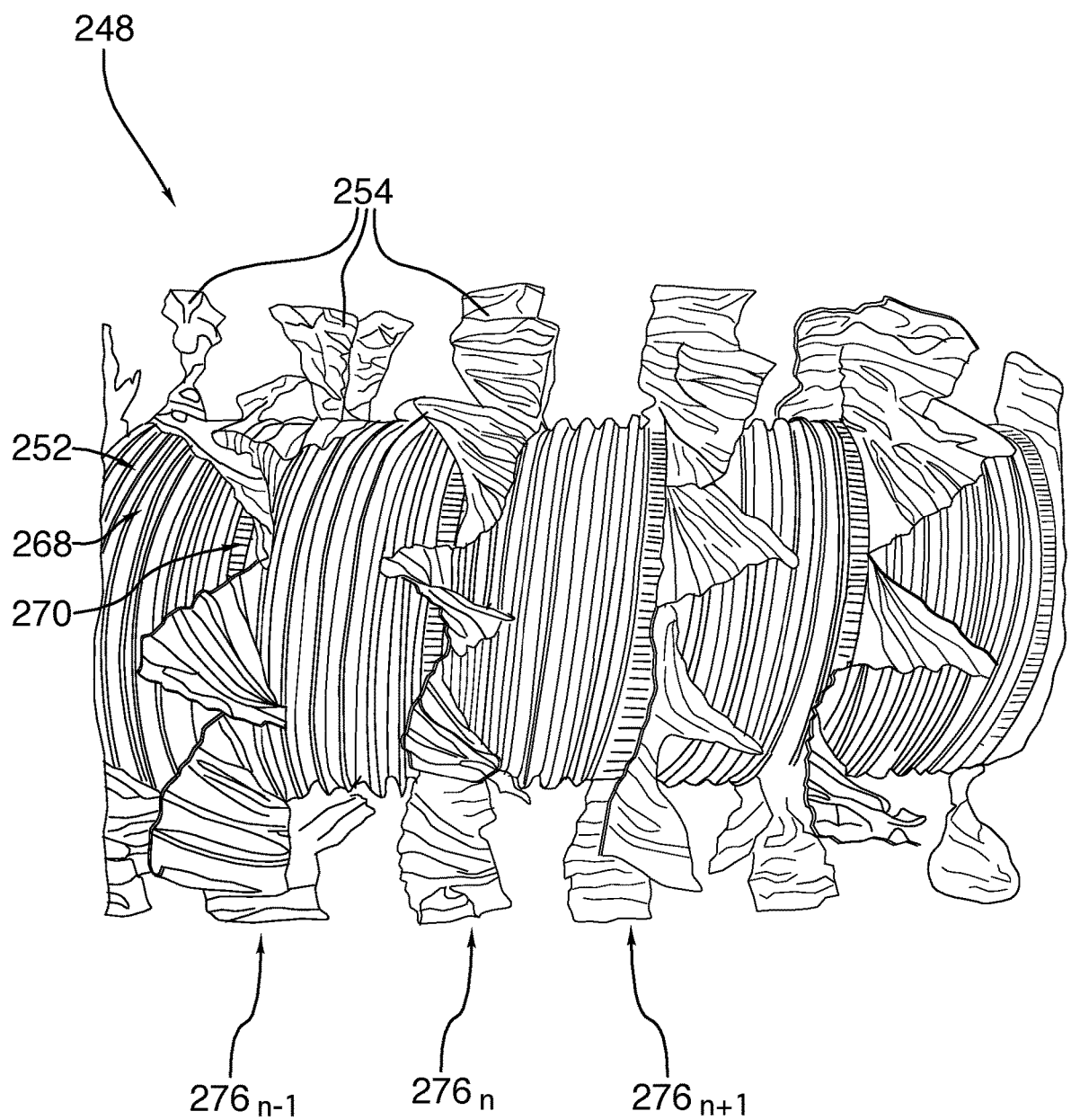
FIG. 8 is a side view of corrugated, flexible circular pipe for use in connection with a heat exchanger system shown in FIG. 1, in accordance with one embodiment.

In one embodiment, each circular pipe 248 of the first and second sets, 246 and 250 is a flexible pipe having a corrugated exterior surface 252 onto which are disposed a plurality of radial fins 254, such as the pipe illustrated in FIG. 8. In an alternate embodiment, each circular pipe 248 has a smooth exterior surface (i.e. a non-corrugated exterior surface) onto which are disposed a plurality of radial fins, similar to radial fins 254. As it will become apparent below, whether the circular pipe 248 has a corrugated exterior surface 252 or a smooth exterior surface, it can be made of a single layer of material (e.g. stainless steel, galvanize steel or aluminum) or it can comprise an interior pipe layer (e.g. interior pipe layer 268) onto which is wound an exterior piper layer (e.g. exterior pipe layer 270).

It should be understood that according to the wanted flow rate or cubic feet per minute (CFM) volumetric flow in the heat exchanger system 100, the number of circular pipes 248 in the first and second sets 246 and 250 can be modified. For instance, the number of circular pipes 248 needs to be increased for an increased CFM and reduced for a reduced CFM. Furthermore, it should be understood that the number of circular pipes 248 of the first and second sets 246 and 250 is equal to the number of circular holes 234 and 238 in the upper and lower perforated plates 220 and 236, respectively. In one exemplary embodiment, the circular pipes 248 of the exchange compartment 212 have a diameter of 2 inches, are about 0.0047 inches thick and are made of a flexible material in order to sustain buckling and the pressure in the exchange compartment 212. Accordingly, the circular pipes 248 may have a ratio of thickness to diameter of about 0.235%, this ratio resulting from the thickness of 0.0047 inches and the diameter of 2 inches. It will be appreciated that circular pipes 248 could have different dimensions. For instance, circular pipes 248 could have a diameter ranging from about one inch to about 6 inches. It will also be appreciated that the size and thickness of the circular pipes 248 can be adapted to meet certain requirements or desired properties of the heat exchanger system 100, such as a desired CFM for instance.

In one embodiment, the exchange compartment 212 is divided equally into, a first compartment 240 and a second compartment 242, by a vertical baffle 244. Baffle 244 extends vertically, upwardly from the lower perforated plate 236 to an intermediate location between the lower perforated plate 236 and the upper perforated plate 220, (best shown in FIGS. 2 and 3). The first compartment 240 is located in registry with the intake section 214 of the upper compartment 210 while the second compartment 242 is located in registry with the outtake section 216 of the upper compartment 210, each of the compartments 240, 242 housing the first and second sets extending vertically from the intake section 214 and the outtake section 216 of the upper compartment 210. As it will become apparent below, vertical baffle 244 contributes to increase the flow of the second fluid about the exterior surface 252 of the circular pipes 248 during the operation of the heat exchanger system 100. In one embodiment, the baffle 244 is 36.973 inches high and extends between the internal surfaces of the lateral walls 202a (not shown) and 202c when the casing 200 is assembled. It will be appreciated that the baffle 244 can be sized, shaped and positioned differently without departing from the scope of the embodiment. It will also be understood that heat exchanger system 100 could have no baffle 244.

To feed the second fluid in the exchange compartment 212, and to expel the second fluid therefrom, casing inlet 256 and casing outlet 258 are provided. The casing inlet 256 comprises a generally rectangular opening 260 and an adaptor 224c. In the illustrated embodiment, the rectangular opening 260 is defined on the lower portion of the lateral wall 202d, above the vertical position of the lower perforated plate 236. Adaptor 224c, which in the illustrated embodiment is identical to adaptor 224a shown in FIG. 6, has a funnelled shape extending from a first end 226, having the matching shape of the rectangular inlet opening 260, to a circular second end 228. Similarly, the casing outlet 258, comprises a generally rectangular opening 262 and an adaptor 224d, identical to the adaptor 224c of the casing inlet 256. Casing outlet 258 is located on a lower portion of lateral wall 202b, above the vertical position of the lower perforated plate 236. As it will become apparent below, casing inlet 256 and casing outlet 258 allow the second fluid conveyed in a ventilation pipe (not shown) to enter the exchange compartment 212 to be heated and to be expelled from the exchange compartment 212 toward an outlet ventilation pipe (not shown) once it has been heated by the warm stale air conveyed in the circular pipes 248 of the first and second sets 246 and 250.

Figure 5:
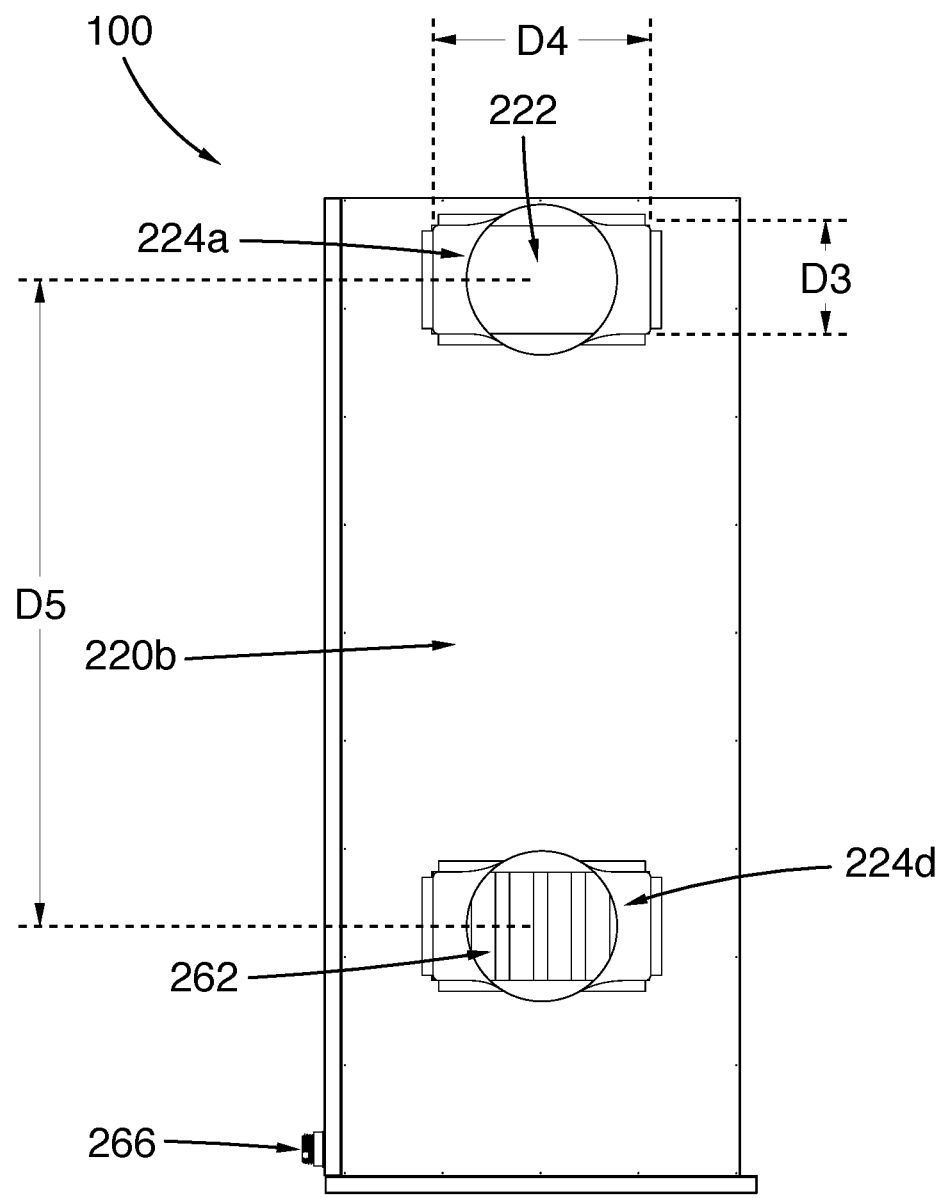
FIG. 5 left side view of the heat exchanger system shown in FIG. 1.

In one embodiment, the inlet opening 222 and outlet opening 232 of the upper compartment 210 and the inlet opening 260 and outlet opening 262 of the exchange compartment 212 have a height D3 of 10 inches and a width D4 of 20 inches (see FIG. 5). Still in FIG. 5, the inlet 222 of the upper compartment 210 and outlet 262 of the exchange compartment 212 are separated by a distance D5 of 49.5 inches. Although in the illustrated embodiment, the inlet and outlet openings 260 and 262 have a rectangular shape, it should be understood that other shapes are possible without departing from the scope of the invention. For instance, the openings 260 and/or 262 could have a different shape such as a square shape, an elliptical shape, or any other suitable shape. Furthermore, they could be positioned elsewhere.

Figure 2:
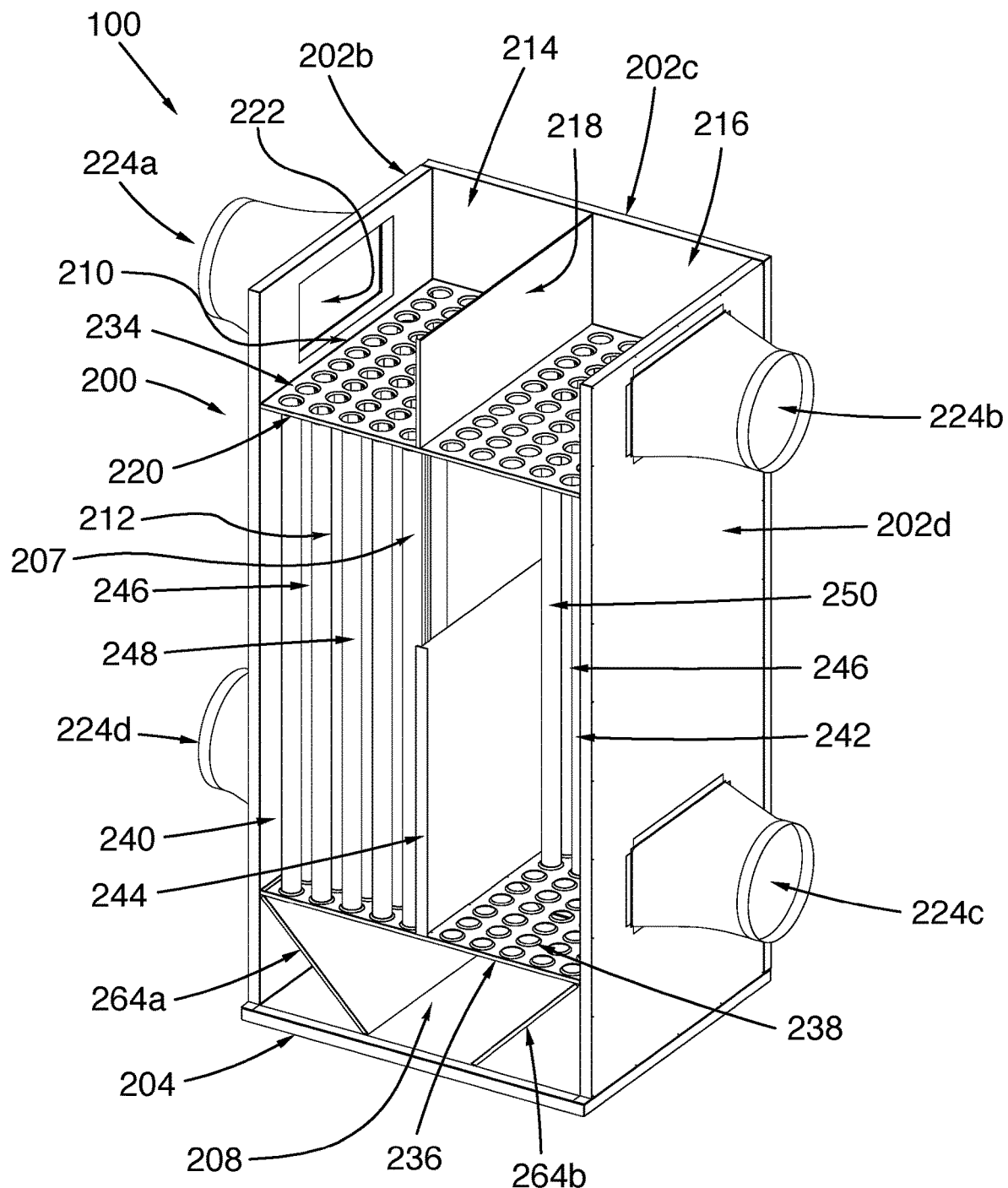
FIG. 2 is a perspective view of the heat exchanger system shown in FIG. 1, where the front and top walls have been removed for better showing an upper compartment, a lower compartment and an exchange compartment.

Provided below the exchange compartment 212 is the lower compartment 208. Lower compartment 208 is configured for allowing the passage of the first fluid the first set of pipes 246 (i.e. the fluid traveling through pipes 248 from the intake section 214 of the upper compartment 210 to the lower compartment 208) to the second set of pipes 250 (i.e. for allowing the fluid to exit the lower compartment 208, through the second set of pipes 250, to reach the outtake section 216). With reference to FIGS. 2 and 3, in one embodiment, the lower compartment 208 comprises a pair of deflector walls 264a and 264b describing a funnelled shape and extending obliquely from the lower wall 204 of the casing 200 to the intersections created by the lower perforated plate 236 and the lateral walls 202b and 202d.

In the illustrated embodiment, the lower compartment 208 further comprises an orifice 266 adapted to evacuate water condensation that can be produced during the operating of heat exchanger system 100. In this embodiment, the orifice 266 of the lower compartment 208 is located on lateral wall 202c. It will be appreciated that orifice 266 could be located elsewhere, for instance on lateral wall 202a or on lower wall 204 of casing 200.

To close orifice 266 during the operation of heat exchange 100, a plug 267 is provided. In one embodiment, orifice 266 and plug 267 include complementary threads to allow a threaded engagement of the plus 267 in orifice 266. In an alternate embodiment, the orifice 266 is operatively connected to a tube or conduit for transporting the collected water condensation or the collected contaminated water to a collecting unit (not shown) and/or is equipped with a valve (not shown).

In another embodiment, the lower compartment 208 is configured to collect impurities, dust and fine particles present in the warm stale air as each circular pipe 248 is cleaned by soapy water thanks to a plurality of sprinklers actuated by the controller as it will be described in more details further. The soapy water mixed with the impurities, dust and fine particles is then evacuated from the lower compartment 208 by the orifice 266.

Having described the general components of the heat exchanger system 100, its operation will now be described with reference to FIG. 7A. In this embodiment, the heat exchanger system 100 is a parallel current flow heat exchanger where the direction of the warm stale air flowing in the circular pipes 248 (see continuous arrows) is the same as the direction of the clean fresh air flowing in the exchange compartment 212 (see arrows in dotted lines). In this embodiment, the warm stale air is conveyed through the adaptor 224a and the opening 222 of the intake section 214 of the upper compartment 210. The warm stale air entering the intake section 214 then enters the plurality of circular holes 234 of the upper perforated plate 220, to travel into the plurality of circular pipes 248 of the first set 246, toward the lower compartment 208.

As the warm stale air reaches the lower compartment 208, it is deviated by the pair of deflector walls 264a, 264b and by the lower wall 204 and redirected into the plurality of circular pipes 248 of the second set 250, through the plurality of circular holes 238 of the lower perforated plate 236. Upon reaching the outtake section 216 of the upper compartment 210, the warm stale air is expelled through the outlet opening 232 of the upper compartment 210.

At the same time, clean fresh air is conveyed through adaptor 224c and through the casing opening 260 to enter the exchange compartment 212. As fresh air travels through the heat exchange compartment 212, it contacts the radially corrugated exterior surface 252 of the circular pipes 248, as well as the plurality of fins 254, which cause a transfer of heat between the clean fresh air flowing in the exchange compartment 212 and the warm stale air circulating in the plurality of circular pipes 248. As it will be appreciated, the fins 254 the of pipes 248 (as well as the corrugated surface 252, if applicable), contribute to increase heat transfer by increasing the heat exchange area and the convective heat transfer coefficient for low density fluids such as air. Moreover, the baffle 244 separating the exchange compartment 212 deviates the flow of clean fresh air to optimize the heat transfer with the circular pipes 248 comprising the fins 254. The newly heated clean air of the exchange compartment 212 is extracted through opening 262 and adaptor 224d from the exchange compartment 212 and can then conveyed to a heating system, for instance, before being conveyed to a room or a building through a ventilation duct or the like.

In an alternate embodiment, the heat exchanger system 100 is a counter-current flow heat exchanger where the direction of the warm stale air flowing in the circular pipes 248 is opposite to the direction of the clean fresh air flowing in the exchange compartment 212, as shown in FIG. 7B. In this alternate embodiment, the warm stale air enters the upper compartment 210 through adaptor 224a (see continuous arrows) while the clean fresh air enters the exchange compartment 212 through adaptor 224d (see arrows in dotted lines). Therefore, the fluid flows are in opposite directions. Similarly to the embodiment shown in FIG. 7A, warm stale air enters the heat exchanger system 100 through adaptor 224a and inlet opening 222, is divided in the plurality of circular pipes 248 thanks to the upper perforated plate 220. The warm stale air therefore travels toward the outlet opening 232 of the outtake section 216. The fresh clean air enters the exchange compartment 212 through adaptor 224d and inlet opening 260 and travels through the exchange compartment 212, around the plurality of pipes 248, and exits through the outlet opening 262. The initially warm stale air therefore exits the heat exchanger system at a colder temperature while the fresh air exits the exchange compartment 212 at a warmer temperature.

In one embodiment, the heat exchanger system 100 is adapted to be installed in environments having warm stale air such as rubber factories, extractor hoods of restaurant kitchens, welding hoods and the like. As it will be appreciated, in such environments, the stale air flowing through the circular pipes 248 of the first and second sets 246, 250 can be rich in dust, impurities or fine particles and the plurality of circular pipes 248 may tend to become clogged or covered, which can result in a reduced efficiency of the heat exchanger system 100.

To prevent such reduction in efficiency of the heat exchanger system 100, in one embodiment, the heat exchanger system is provided with a cleaning system 600 configured for cleaning the circular pipes 248 and maintain the heat exchanger system 100 at a high efficiency. In this embodiment, the cleaning system 600 comprises plurality of sprinklers 602 located on the upper wall 206 of the casing 200, which deliver water, soap and/or other liquids to the plurality of pipes 248 for washing their interior surface from the impurities, dust and fine particles. As the cleaning system 600 is activated, the impurities, dust and fine particles are collected by the liquid and travel from the top of the pipes 248 to the bottom thereof, to be collected in the lower compartment 208. The liquid containing the impurities, dust and fine particles can then be removed from the heat exchanger system 100 through orifice 266.

As it will be appreciated, the operation of the heat exchanger system can be electronically controlled using a controller (not shown). In one embodiment, the controller of the heat exchanger system 100 is actuated to turn on the heat exchanger system 100 and to convey simultaneously warm stale air in the circular pipes 248 and clean fresh air in the exchange compartment 212. In an alternate embodiment, the controller also actuates the cleaning system 600 periodically, or when it calculates a decreased efficiency of the heat exchanger system. Once the plurality of circular pipes 248 are cleaned, the controller stops the sprinklers and allows the air flow to restart.

While the heat exchanger system 100 has been described in connection with a single unit 100, it is possible to connect a second heat exchanger system 100 in parallel to accommodate the CFM volumetric flow wanted. Such a configuration may be useful if, for instance, the desired CFM volumetric flow required is higher than the maximum CFM volumetric flow available from one heat exchanger system 100. Furthermore, while the heat exchanger system 100 has been described in connection with two gases, in an alternative embodiment, the fluid conveyed through the heat exchanger system 100 is either water or a liquid coolant.

Having described the heat exchanger system 100 and its general operation, a first embodiment of a circular pipe 248 will now be described with reference to FIG. 8. While the pipe 248 of this embodiment can be used in conjunction with heat exchanger system 100, it will be appreciated that it could have other uses.

In this embodiment, circular pipe 248 is a flexible, corrugated pipe comprising an interior pipe layer 268 and an exterior pipe layer 270. It will be understood that the term "corrugated" as used herein is intended to be interpreted broadly as including any type of corrugated, crenellated, ridged, ribbed or grooved structures. In one embodiment, the interior pipe layer 268 and the exterior pipe layer 270 are made from non-combustible material, such as stainless steel, galvanized steel or aluminum. As it will be appreciated, even if the material in which the interior and exterior pipe layers 268 and 270 are typically considered as being relatively rigid materials, the presence of corrugations provides flexibility characteristics to the pipe of this embodiment.

The interior pipe layer 268 is a helical, corrugated pipe and the exterior pipe layer 270 is helical, corrugated pipe element, mounted about the exterior face of the interior pipe layer 268. In this embodiment, the diameter, the corrugations of the exterior pipe layer 270, as well at the distance separating two adjacent rings (e.g. $276_n$ and $276_{n+1}$), generally match the diameter, the corrugations and the distance separating two adjacent rings of the interior pipe layer 268. In this manner, the corrugations of the exterior pipe layer 270 are receivable in corresponding corrugations of the interior pipe layer 268 so as to minimize the distance between them and maximizing contact between the interior pipe layer 268 and the exterior pipe layer.

Figure 9:
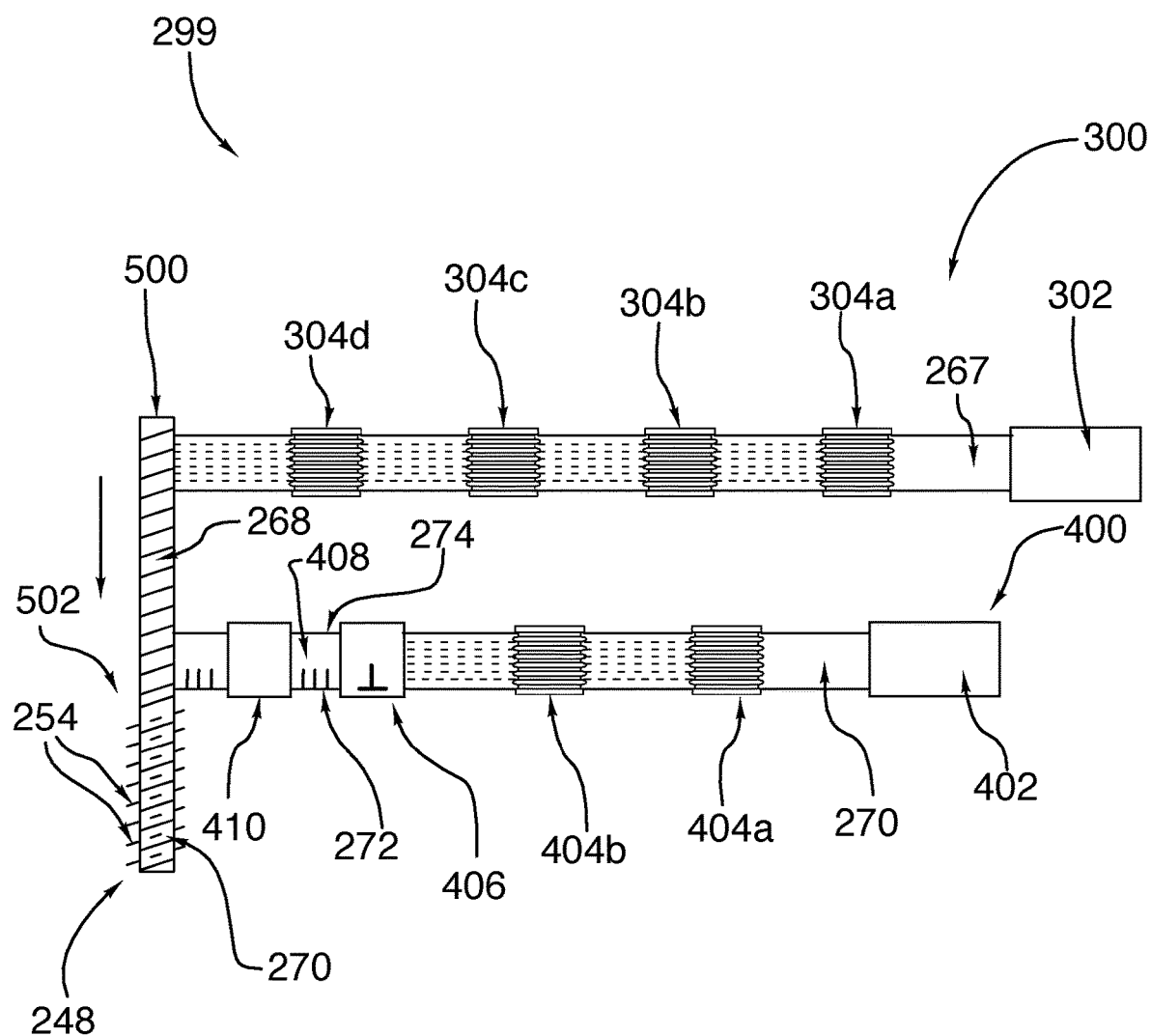
FIG. 9 is top, schematic representation of one embodiment of an apparatus for manufacturing the circular pipe shown in FIG. 8.
Figure 10:
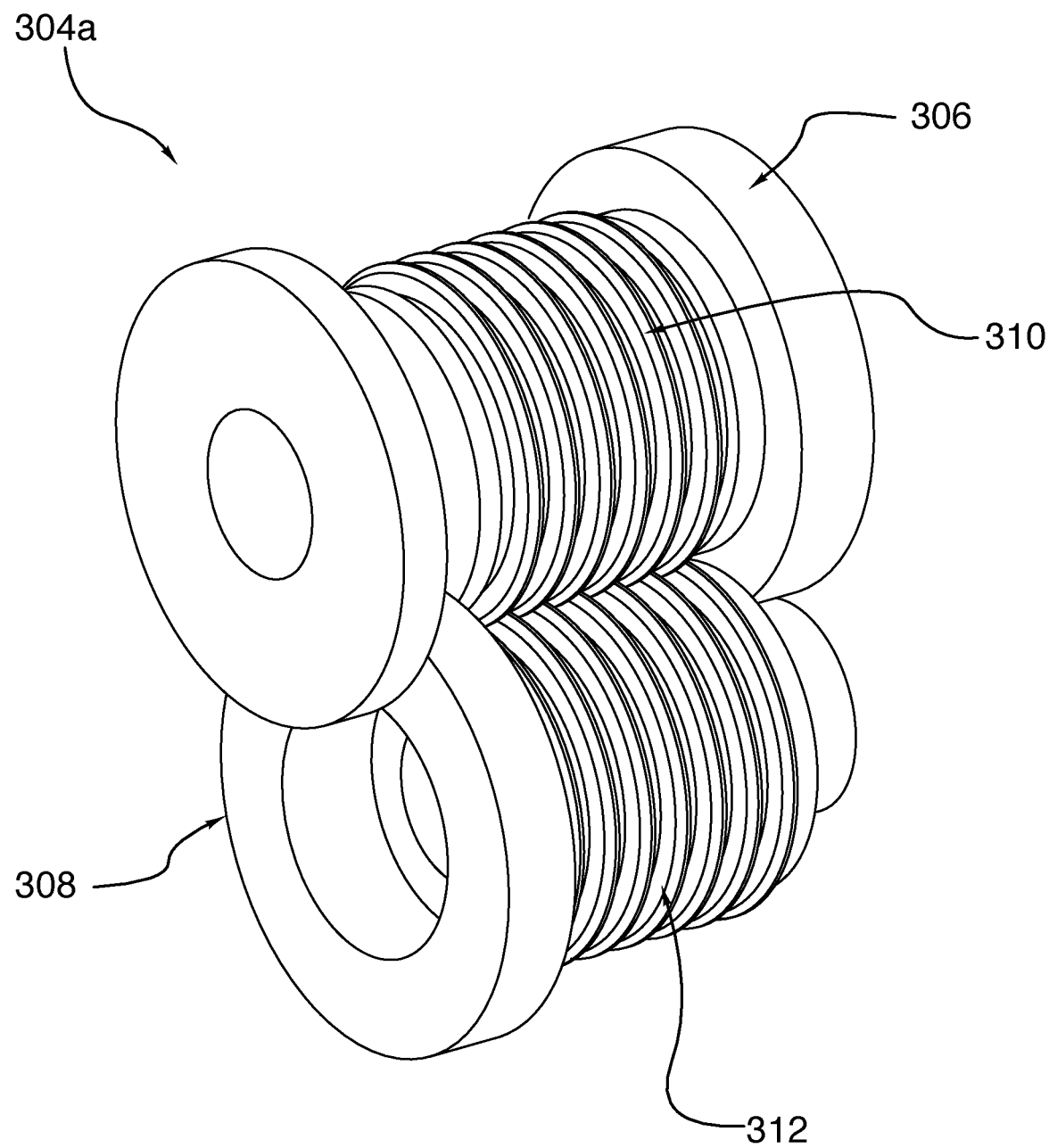
FIG. 10 is a perspective view of a corrugating roller for use in the apparatus shown in FIG. 9, in accordance with one embodiment.
Figure 11:
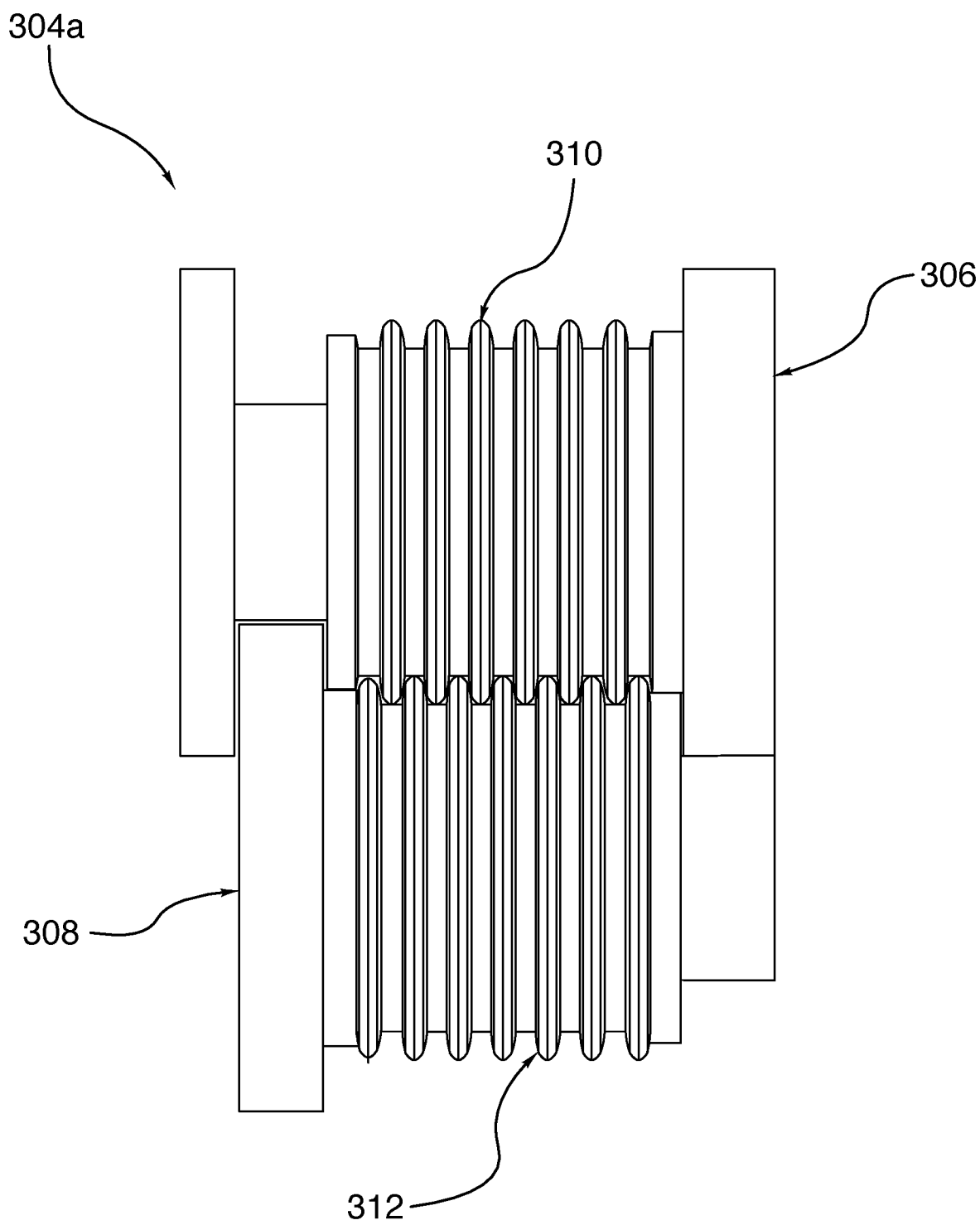
FIG. 11 is a front view of the corrugating roller unit shown in FIG. 10.

With reference to FIGS. 9 to 11, there is shown an embodiment of an apparatus 299 for manufacturing flexible pipes having a corrugated exterior surface and radially extending fins such as circular pipe illustrated in FIG. 8. In the illustrated embodiment, apparatus 299 comprises a first unit 300 adapted to manufacture the interior pipe layer 268 and a second unit 400 adapted to manufacture the exterior pipe layer 270 having a plurality of fins 254 and to sequentially assemble the same over the interior pipe layer 268. The interior and exterior pipe layers 268 and 270 are then merged onto a rolling shaft 500 to form the circular pipe 248 comprising the corrugated exterior surface 252 having the plurality of radial fins 254.

In the first corrugating unit 300, a first sheet of material 267 (e.g. stainless steel, galvanized steel or aluminum) is conveyed from a first deposit 302 and corrugated through a first series of corrugating roller units 304a, 304b, 304c and 304d, to obtain the corrugated interior pipe layer 268 having exterior surface 252. The corrugating roller units 304a, 304b, 304c and 304d being identical to each other, only corrugated roller unit 304a is illustrated in FIGS. 10 and 11.

The corrugating roller unit 304a comprises an upper corrugating roller 306 having a plurality of protrusions 310 located on the exterior surface thereof and a lower corrugating roller 308 also having a plurality of protrusions 312 located on the exterior surface thereof. When the corrugating roller unit 304a is assembled, the upper and lower corrugating rollers 306 and 308 are positioned so as to have a staggered arrangement of the protrusions 310 and 312, as illustrated in FIG. 11. Therefore, as the corrugating roller unit 304a is actuated, the upper roller 306 rotates in a first direction and the lower roller 308 in the opposite direction and the first sheet of material 267 is conveyed therebetween to be corrugated, as a person skilled in the art would understand.

Once corrugated through the successive corrugating roller units 304a to 304d, the sheet of material 267 is wrapped around a rolling shaft 500 having the desired diameter for the circular pipe 248. Therefore, as the first sheet of material 267 is wrapped around the rolling shaft 500, it is moved helically along the illustrated arrow, and perpendicularly relative to the first series corrugating rollers 304a, 304b, 304c and 304d, to become the interior pipe layer 268.

In the second corrugating unit 400, the second sheet of material 269 (e.g. stainless steel, galvanized steel or aluminum) is similarly conveyed from a second deposit 402 and corrugated through a second series of corrugating roller units 404a and 404b, identical to the corrugating roller units 304a to 304d of FIGS. 10 and 11. The second sheet of material 269 is then partially transversally cut by a cutting unit 406 which makes consecutive transverse cuts 408, extending from a first side 272 of the second sheet of material 269 to and intermediate location between the first side 272 and the second side 274 thereof. In one embodiment, the cutting unit 406 comprises at least one cutting roller rotating about a rotation axis perpendicular to the travel direction of the second sheet of material 269 (i.e. perpendicular to the longitudinal corrugations of the second sheet of material 269). The cutting roller comprises at least one cutting projection extending radially and parallel to the rotation axis of the cutting roller. In this embodiment, the cutting projection collaborates with a plane surface or another roller located under the second sheet of material 269 to define the transverse cuts 408. As it will be appreciated, the length of the cuts 408 will vary according to the length of the cutting projection. Also, the distance between two adjacent cuts 408 will vary according to the diameter of the cutting roller (i.e. the distance separating two adjacent cuts 408 will be smaller if a smaller diameter cutting roller is used while a greater distance between two adjacent cuts 408 will be provided with a cutting roller having a greater diameter) and/or according to the number of cutting projections extending radially from the cutting roller (i.e. a smaller distance will be provided between two adjacent cuts 408 with an increased number of radially extending projections).

While in this embodiment the cutting projection extends parallel to the rotation axis of the cutting roller (i.e. an angle of 0 degrees), it will be appreciated that it could extend at an angle relative to the rotation axis of the cutting roller, for instance at an angle ranging from 0 to 45 degrees relative to the orientation of the rotation axis. In such a case, the cuts 408 defined on the second sheet of material 269 would have a corresponding angle.

Once the cuts 408 are defined on the second sheet of material 269, the portions of the sheet 269 between two adjacent cuts 408 are then lifted and optionally twisted, thanks to a lifting unit 410, to obtain the plurality of radial fins 254 shown in FIG. 8. Alternatively, the portions of the sheet 269 between two adjacent cuts 408 could be lifted and optionally twisted manually. The second sheet of material 269 is then merged onto the exterior surface 252 of the interior pipe layer 268 and is wrapped around thereof at the merging section 502 of the rolling shaft 500, to define the exterior pipe layer 270.

Therefore, as the second sheet of material 269 is merged onto the interior pipe layer 268, the fins 254 created by the lifting and twisting of portions between the adjacent the cuts 408 are radially disposed on the exterior surface of the interior pipe layer 268, thus forming a plurality if successive rings of fins $276_n$. The circular pipe 248 is therefore created as the interior and exterior pipe layers 268 and 270 are merged together and are helically and perpendicularly displaced along the rolling shaft 500 relative to the first and second corrugating units 300 and 400. To maintain the exterior pipe layer 270 into position on the interior pipe layer 268, staples, adhesives or other types of suitable fasteners can be used.

While the pipe 248 illustrated in FIG. 8 comprises two superimposed pipe layers (i.e. interior pipe layer 268 and exterior pipe layer 270), pipe 248 could be manufactured differently. In an alternate embodiment, pipe 248 is a flexible, corrugated pipe comprising only one pipe layer, combining the characteristics of the interior and exterior pipe layers 268 and 270 of the pipe illustrated in FIG. 8. More specifically, in this embodiment, the pipe comprises a single, helical, corrugated pipe layer comprising radially extending fins 254.

Figure 12:
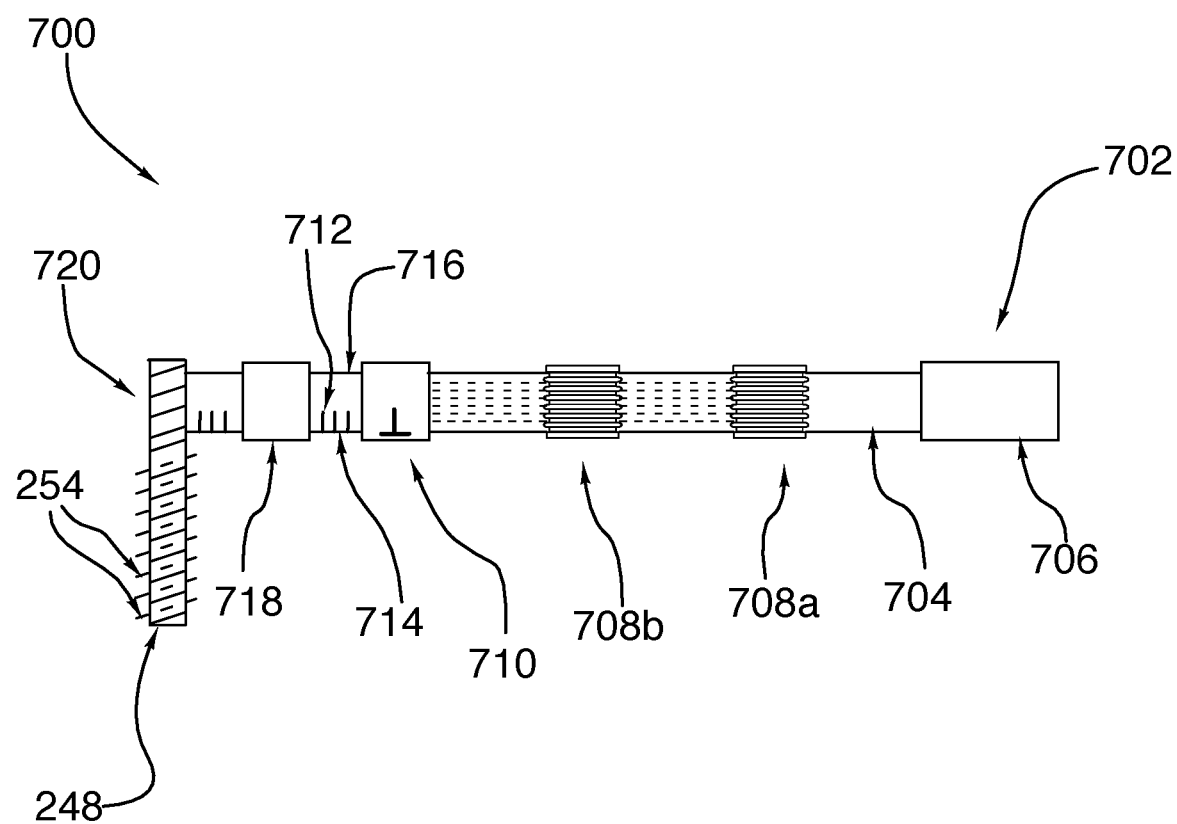
FIG. 12 is a top, schematic representation of another embodiment of an apparatus for manufacturing a circular pipe.

With reference to FIG. 12, there is shown an embodiment of an apparatus 700 for manufacturing flexible pipes having such a single corrugated pipe layer and radially extending fins. In the illustrated embodiment, apparatus 700 comprises a unit 702 adapted to manufacture the corrugated single pipe layer having a plurality of fins 254, in which a sheet of material 704 (e.g. stainless steel, galvanized steel or aluminum) is conveyed from a deposit 706 and corrugated through a first series of corrugating roller units 708a and 708b. In this embodiment, the corrugating roller units 708a and 708b are similar to corrugated roller unit 304a illustrated in FIGS. 10 and 11.

The corrugated sheet of material 704 is then partially transversally cut by a cutting unit 710 which makes consecutive transverse cuts 712, extending from a first side 714 of the sheet of material 704 to and intermediate location between the first side 714 and the second side 716 thereof. In one embodiment, the cutting unit 710 is similar to cutting unit 406 described in connection with FIG. 9. The portions of the sheet of material 704 between two adjacent cuts are then lifted and optionally twisted, thanks to a lifting unit 718, to obtain the plurality of radial fins 254.

Once corrugated through the successive corrugating roller units 708a and 708b, the cutting unit 710 and the lifting unit 718, the sheet of material 704 is wrapped around a rolling shaft 720 having the desired diameter for the circular pipe 248. Therefore, as the sheet of material 704 is wrapped around the rolling shaft 720, it is moved helically along the illustrated arrow, and perpendicularly relative to the series corrugating rollers 708a and 708b, to become the pipe 248 with radially extending fins 254.

While in the above-described embodiments the pipe 248 is a flexible pipe, thanks to the corrugations defined on the pipe layers (e.g. interior pipe layer 268 and exterior pipe layer 270), it may be desirable to have a pipe 248 that is rigid in some instances. Accordingly, in an alternate embodiment, pipe 248 is a rigid pipe having a smooth surface (i.e. a non-corrugated surface). In such an alternate embodiment, pipe 248 can comprises an interior pipe layer and an exterior piper layer, whereby such a rigid pipe is manufactured using an apparatus such as apparatus 299 described above. However, where a rigid pipe is desired, the steps of corrugating the first sheet of material 267 and the second sheet of material 269 using first and second corrugating units 300 and 400 are omitted. As such, the first and second sheets of material 267 and 269 have a smooth surface when they are wound about rolling shaft 500, and the absence of corrugations prevent the pipe 248 from substantially flexing. In a like manner, it is possible to manufacture a rigid pipe 248 by using apparatus 700, also by omitting the step of corrugating the sheet of material with corrugating roller units 708a and 708b.

In one embodiment, the fins 254 are straight and radially disposed relative to the circular pipe 248. In an alternative embodiment, the fins 254 are inclined and radially disposed relative to the circular pipe 248. As it will be appreciated, in use, the radially corrugated exterior surface 252 associated with a plurality of radial fins 254 improves the heat transfer occurring between the warm stale air circulating in the plurality of circular pipes 248 and the clean fresh air traveling in the exchange compartment 212 by increasing the area of heat transfer and therefore boosting the convective heat exchanges.

The embodiments described above are intended to be exemplary only. The scope of the invention is therefore intended to be limited solely by the appended claims.

The invention claimed is:
1. A heat exchanger system comprising:
a housing comprising a lower wall, an upper wall and a side wall extending therebetween, the housing defining a chamber including a lower compartment, an upper compartment and a heat exchange compartment extending therebetween, the upper compartment comprising an intake section and an outtake section;
an upper perforated plate dividing the chamber into the upper compartment and the heat exchange compartment, the upper perforated plate comprising a plurality of intake holes located in the intake section and a plurality of outtake holes located in the outtake section;

a lower perforated plate dividing the chamber into the lower compartment and the heat exchange compartment, the lower perforated plate comprising first and second holes;

a plurality of flexible intake pipes associated with the plurality of intake holes of the upper perforated plate and with one of the first and second holes of the lower perforated plate, the plurality of flexible intake pipes being configured for conveying a first gas at a first temperature from the intake section of the upper compartment to the lower compartment;

a plurality of flexible outtake pipes associated with the plurality of outtake holes, wherein at least one outtake hole of the upper perforated plate and the other of the first and second holes of the lower perforated plate, the plurality of flexible outtake pipes being configured for conveying the first gas from the lower compartment to the outtake section of the upper compartment;

an inlet defined in the at least one side wall and allowing the first gas to enter the intake section of the upper compartment;

an outlet defined in the at least one side wall and allowing the first gas to exit the outtake portion of the upper compartment; and a pair of openings defined in the at least one side wall for allowing a flow of a second gas at a second temperature to travel in the heat exchange compartment, around at least one of the plurality of flexible intake pipes and at least one of the plurality of flexible outtake pipes, wherein at least one of the plurality of flexible intake pipes and of the plurality of flexible outtake pipes is corrugated from the upper perforated plate to the lower perforated plate, and wherein the first gas and the second gas are low density gases, the plurality of flexible intake pipes and the plurality of flexible outtake pipes having a thickness to diameter ratio of about 0.235%.

2. The heat exchanger system of claim 1, wherein the housing comprises a box-shaped housing.

3. The heat exchanger system of claim 2, wherein the box-shaped housing comprises the lower wall, the upper wall and four side walls extending therebetween.

4. The heat exchanger system of claim 1, wherein the intake section and the outtake section of the upper compartment are defined by a divider.

5. The heat exchanger system of claim 4, wherein the divider extends from the upper perforated plate to the upper wall of the housing.

6. The heat exchanger system of claim 1, wherein the lower compartment comprises a pair of deflector walls for redirecting the first gas from the plurality of flexible intake pipes toward the plurality of flexible outtake pipes.

7. The heat exchanger system of claim 1, wherein the lower compartment comprises an orifice for expelling a condensation liquid generated during the operation of the heat exchanger system.

8. The heat exchanger system of claim 1, further comprising a cleaning system.

9. The heat exchanger system of claim 8, wherein the cleaning system comprises at least one sprinkler mounted in the upper compartment and configured for sprinkling a liquid into at least one of the plurality of flexible intake pipes and into at least one of the plurality of flexible outtake pipes.

10. The heat exchanger system of claim 9, wherein the at least one sprinkler is mounted to the upper wall of the housing.

11. The heat exchanger system of claim 1, wherein at least one of the plurality of flexible intake pipes and at least one of the plurality of flexible outtake pipes are circular pipes.

12. The heat exchanger system of claim 11, wherein the circular pipes are corrugated.

13. The heat exchanger system of claim 12, wherein at least one of the plurality of flexible intake pipes and at least one of the plurality of flexible outtake pipes comprise a plurality of fins extending radially.

14. The heat exchanger system of claim 13, wherein the fins are distributed along the length of the at least one of the plurality of flexible intake pipes and the plurality of flexible outtake pipes in a helical pattern.

15. The heat exchanger system of claim 12, wherein at least one of the plurality of flexible intake pipes and at least one of plurality of flexible outtake pipes comprise an interior pipe layer and an exterior pipe layer.

16. The heat exchanger system of claim 15, wherein the exterior pipe layer comprises a plurality of fins extending radially.

17. The heat exchanger of claim 15, wherein the exterior pipe layer is wound about the interior pipe layer.

18. The heat exchanger system of claim 15, wherein the interior pipe layer and the exterior pipe layer are corrugated.

19. The heat exchanger system of claim 18, wherein corrugations of the corrugated exterior pipe layer match corrugations of the corrugated interior pipe layer.

20. The heat exchanger system of claim 19, wherein corrugations of the corrugated exterior pipe layer are in registry with corrugations of the corrugated internal pipe layer.

21. The heat exchanger system of claim 1, wherein the pipe is made from a material selected from the group consisting of stainless steel, galvanized steel and aluminum.

22. The heat exchanger system of claim 1, wherein the first gas is stale air and the second gas is clean air.

23. The heat exchanger of claim 22, wherein the stale air travels sequentially in the intake section, in at least one of the plurality of flexible intake pipes, the lower compartment, in at least one of the plurality of flexible outtake pipes, and the outtake section; while the clean air travels around the at least one the plurality of flexible intake pipes and the at least one the plurality of flexible outtake pipes in the heat exchange compartment.

24. The heat exchanger system of claim 1, wherein the heat exchanger system comprises one of a current flow heat exchanger system and a counter-current flow heat exchanger system.

25. The heat exchanger system of claim 1, the plurality of flexible intake pipes and the plurality of flexible outtake pipes having a diameter from about 1 inch to about 6 inches.

26. The heat exchanger system of claim 1, the plurality of flexible intake pipes and the plurality of flexible outtake pipes having pipe walls with a thickness of about 0.0047 inches.

27. The heat exchanger system of claim 1, the at least one of the plurality of flexible intake pipes and of the plurality of flexible outtake pipes being helicoidally corrugated from the upper perforated plate to the lower perforated plate.

* * * * *